US010282535B2

(12) United States Patent
Tunnell et al.

(10) Patent No.: US 10,282,535 B2
(45) Date of Patent: May 7, 2019

(54) METHOD AND SYSTEM TO VALIDATE IDENTITY WITHOUT PUTTING PRIVACY AT RISK

(71) Applicant: NXT-ID, Inc., Shelton, CT (US)

(72) Inventors: Andrew Tunnell, Palm Bay, FL (US); Christopher Santillo, Sebastian, FL (US); Justin Mitchell, Saint Cloud, FL (US); Sean Powers, Melbourne, FL (US)

(73) Assignee: NXT-ID, INC., Shelton, CT (US)

( * ) Notice: Subject to any disclaimer, the term of this patent is extended or adjusted under 35 U.S.C. 154(b) by 333 days.

(21) Appl. No.: 14/842,252

(22) Filed: Sep. 1, 2015

(65) Prior Publication Data

US 2016/0085954 A1   Mar. 24, 2016

Related U.S. Application Data

(60) Provisional application No. 62/044,500, filed on Sep. 2, 2014.

(51) Int. Cl.
*G06F 21/32* (2013.01)
*G06F 21/62* (2013.01)
(Continued)

(52) U.S. Cl.
CPC .............. *G06F 21/34* (2013.01); *G06F 21/32* (2013.01); *G06F 21/35* (2013.01);
(Continued)

(58) Field of Classification Search
CPC .......... G06F 21/32; G06F 21/34; G06F 21/35; G06F 21/6245; H04L 63/18;
(Continued)

(56) References Cited

U.S. PATENT DOCUMENTS

| 4,048,618 A | * | 9/1977 | Hendry | ................ A61B 5/1172 340/5.83 |
| 5,872,834 A | * | 2/1999 | Teitelbaum | ............. H04M 1/66 379/110.01 |

(Continued)

FOREIGN PATENT DOCUMENTS

CN            103118000 A      5/2013

*Primary Examiner* — Michael Simitoski
(74) *Attorney, Agent, or Firm* — Beusse Wolter Sanks & Maire, PLLC; John L. DeAngelis

(57) ABSTRACT

A method and system to verify identity while protecting private data. To locally verify identity without requiring communication with an external database or passing personal/identity information over network connections. To create a database and/or statistical model for later use to verify identify, private information from a first media is input to a device. Private information subsequently presented via a second media is then verified locally by comparing to the private information previously captured from the first media. If the resultant correlation score is sufficiently high the private information from the first media and from the second media are determined to belong to the same individual, and the user is authenticated or a desired action is approved. In case of a low correlation score, a notification may be sent to one or more entities alerting authorities of a security breach or identity theft.

17 Claims, 6 Drawing Sheets

(51) Int. Cl.
*G06Q 30/02* (2012.01)
*H04L 29/06* (2006.01)
*G06F 21/34* (2013.01)
*G06F 21/35* (2013.01)

(52) U.S. Cl.
CPC ..... *G06F 21/6245* (2013.01); *G06Q 30/0248* (2013.01); *H04L 63/0853* (2013.01); *H04L 63/18* (2013.01)

(58) Field of Classification Search
CPC ............ H04L 63/0853; G06Q 30/0248; G06Q 20/367; G06Q 20/3672; G06Q 20/3674; G06Q 20/3676; G06Q 20/3678
See application file for complete search history.

(56) References Cited

U.S. PATENT DOCUMENTS

| | | | |
|---|---|---|---|
| 6,487,301 B1* | 11/2002 | Zhao | G06F 21/10 382/100 |
| 6,758,394 B2 | 7/2004 | Maskatiya | G06Q 20/18 235/379 |
| 7,233,690 B2* | 6/2007 | Lacy | G06Q 20/042 382/116 |
| 7,260,237 B2* | 8/2007 | Nishimoto | G07C 9/00087 382/100 |
| 7,382,911 B1* | 6/2008 | Meier | G06K 7/10851 382/139 |
| 8,590,022 B2* | 11/2013 | Faryna | G06F 21/35 455/411 |
| 8,620,039 B2 | 12/2013 | Burke | |
| 9,218,624 B2* | 12/2015 | Moghadam | G06Q 40/04 |
| 9,269,010 B2* | 2/2016 | Abulafia | G06K 9/2054 |
| 9,659,297 B2* | 5/2017 | Russell | G06Q 20/40145 |
| 9,691,075 B1* | 6/2017 | Ray | G06Q 30/0201 |
| 2001/0047331 A1* | 11/2001 | Malanga | G06Q 20/04 705/40 |
| 2002/0184509 A1* | 12/2002 | Scheidt | G06F 21/10 713/182 |
| 2003/0115490 A1* | 6/2003 | Russo | G06K 9/00026 726/5 |
| 2003/0219122 A1* | 11/2003 | Ramirez | G06Q 20/042 380/54 |
| 2005/0091490 A1* | 4/2005 | Ogura | G06F 21/34 713/165 |
| 2005/0144464 A1* | 6/2005 | Chiu | G06F 21/32 713/186 |
| 2005/0244037 A1* | 11/2005 | Chiu | G06F 21/32 382/124 |
| 2006/0022034 A1* | 2/2006 | Barkan | G06Q 20/042 235/380 |
| 2006/0156385 A1* | 7/2006 | Chiviendacz | G06F 21/36 726/2 |
| 2006/0255126 A1* | 11/2006 | Hein | G06K 19/08 235/380 |
| 2007/0106903 A1* | 5/2007 | Scheidt | G06K 9/00006 713/182 |
| 2007/0219928 A1* | 9/2007 | Madhogarhia | G06F 21/32 705/75 |
| 2008/0095409 A1* | 4/2008 | McQuaide | G07C 9/00087 382/115 |
| 2008/0120509 A1* | 5/2008 | Simon | G06K 19/0718 713/186 |
| 2009/0052751 A1* | 2/2009 | Chaney | G06F 21/33 382/120 |
| 2009/0070593 A1* | 3/2009 | Boshra | G07C 9/00158 713/186 |
| 2009/0100269 A1* | 4/2009 | Naccache | H04L 9/3271 713/186 |
| 2009/0164797 A1* | 6/2009 | Kramer | G06F 21/32 713/186 |
| 2009/0299901 A1* | 12/2009 | Garcia | G06Q 20/1085 705/43 |
| 2010/0026451 A1* | 2/2010 | Erhart | G06F 21/32 340/5.53 |
| 2011/0197271 A1* | 8/2011 | Buck | G06F 3/1204 726/9 |
| 2012/0143760 A1* | 6/2012 | Abulafia | G06K 9/2054 705/44 |
| 2012/0163676 A1* | 6/2012 | Mandelbaum | G06F 17/2211 382/115 |
| 2013/0200146 A1* | 8/2013 | Moghadam | G06Q 40/04 235/379 |
| 2013/0218721 A1* | 8/2013 | Borhan | G06Q 20/322 705/26.41 |
| 2014/0006277 A1 | 1/2014 | Rao | |
| 2014/0101048 A1* | 4/2014 | Gardiner | G06Q 20/3276 705/44 |
| 2014/0246490 A1* | 9/2014 | Graylin | G06Q 20/3674 235/379 |
| 2014/0279516 A1* | 9/2014 | Rellas | G06Q 30/0185 705/44 |
| 2014/0343943 A1* | 11/2014 | Al-Telmissani | G10L 17/00 704/246 |
| 2014/0363057 A1* | 12/2014 | Eckel | G06F 21/32 382/116 |
| 2014/0365782 A1* | 12/2014 | Beatson | G06F 21/32 713/186 |
| 2015/0001300 A1* | 1/2015 | Kumar | G06K 7/10 235/454 |
| 2015/0003666 A1* | 1/2015 | Wang | G06K 9/00463 382/100 |
| 2015/0003733 A1* | 1/2015 | Wang | G06K 9/3283 382/182 |
| 2015/0006362 A1* | 1/2015 | Mitchell | G06K 7/10 705/39 |
| 2015/0078629 A1* | 3/2015 | Gottemukkula | G06K 9/0061 382/117 |
| 2015/0081495 A1* | 3/2015 | Randall | G06Q 40/02 705/35 |
| 2015/0186636 A1* | 7/2015 | Tharappel | G06F 21/32 726/8 |
| 2015/0324788 A1* | 11/2015 | Graylin | G06Q 20/12 705/67 |
| 2015/0339662 A1* | 11/2015 | Huang | G06Q 20/34 705/67 |
| 2016/0019431 A1* | 1/2016 | Wang | G06K 9/2054 382/182 |
| 2016/0063300 A1* | 3/2016 | Du | G06K 9/00033 382/124 |
| 2016/0147987 A1* | 5/2016 | Jang | G06F 21/32 726/19 |
| 2016/0307199 A1* | 10/2016 | Patel | G06Q 20/32 |
| 2016/0321452 A1* | 11/2016 | Richardson | G06F 21/50 |
| 2017/0046668 A1* | 2/2017 | Rowley | G06Q 20/10 |
| 2017/0154330 A1* | 6/2017 | Graylin | G06Q 20/3674 |
| 2017/0195310 A1* | 7/2017 | Tyler | H04L 63/083 |
| 2017/0213022 A1* | 7/2017 | Potash | G06F 21/10 |
| 2017/0262701 A1* | 9/2017 | Mandelbaum | G06F 17/2211 |

* cited by examiner

METHOD AND SYSTEM TO VALIDATE IDENTITY WITHOUT PUTTING PRIVACY AT RISK

CROSS REFERENCE TO RELATED APPLICATIONS

This patent application claims the benefit of U.S. provisional patent application filed on Sep. 2, 2014 and assigned Application No. 62/044,500, incorporated herein in its entirety.

FIELD

The present invention relates to the general field of personal information security, financial account security, and fraud prevention.

BACKGROUND

Adding financial accounts such as payment cards to a mobile device has historically consisted of simply entering the account number into software generally connected directly to a server or cloud database. US patent application publication 20140006277 represents one such invention that allows users to simply enter their financial accounts into a digital wallet. Few if any security limits are placed on which cards can be added to a smart wallet.

Because of limited security validation processes, the risk of theft of credit card information associated with the use of digital electronic and/or smart wallets is increased. For instance, when a cashier receives a credit card from its owner, the cashier may simply swipe the card to store its contents onto a digital, electronic or smart wallet, as a non-limiting example. The cashier can later reuse the credit card without the owner's approval, thereby stealing money from the credit card owner or even the identity of the credit card owner.

Current methods to prevent such fraud include but are not limited to verifying account information and/or validating user identity over the Internet. Such methods cannot always protect privacy and are susceptible to other fraudulent attacks, such as man-in-the-middle attacks. Passing financial account and other private information over a cloud connection or any network connection to perform authentication, validation, verification, storage, background checks and the like, facilitates identity theft rather than prevents it, since such information can be intercepted by others over these public networks. Furthermore, a live network connection is required to access the verification service, making authentication impossible within a local, offline environment.

SUMMARY

A method and system to validate or verify a user's identity (sometimes referred to herein as a holder or as a holder's identity) while protecting the user's private information by limiting its dissemination is disclosed. According to one embodiment, private information obtained from locally available sources, such as cards and/or other media (sometimes referred to herein as a first media), is verified by comparing with information previously captured from another media (sometimes referred to herein as a second media). Information is considered verified, validated and/or authenticated (and the holder of that information is verified, validated or authenticated) if the information from each media correlates and yields a sufficiently high correlation score. For example, the information may be validated (e.g., the holder of the information validated) if the correlation score exceeds a predetermined threshold. Thus if the correlation score exceeds that threshold, data from the first media is determined to belong to the same individual as the data from the second media. In this way, the holder is authenticated or verified to use a device or gain access to a secure area, for example.

As a non-limiting example, a user may enter data associated with one media and later enter data associated with a second media. The data entry operation may be accomplished by a swipe-in operation, such as for a magnetic strip card, keyboard entry, biometrics entry, optical character recognition entry, scan entry, any other data input operations, etc. Also, in lieu of performing a data entry operation, the data may have been previously stored on the device or media.

A name and/or portion of a name on the first media, for example, may be considered or recorded as a security identifier for the first card. If the name and/or portion of a name of the second media does not match the name or portion of the name of the first media, then the second media will not be accepted and thus the holder of the second card will not be authenticated. However, if the name of the second media matches the first media, then the second media may be accepted and the holder is authenticated or verified.

As another non-limiting example, a correlation score may be represented by one or more characters, such as 1234. In some non-limiting embodiments, a larger number indicates a higher correlation score. In other non-limiting embodiments, the score may contain non-numeric characters such as letters or symbols. Each character may represent a relative greater or a smaller value.

In another embodiment, identifiers on the first media are compared with identifiers on the second media. The correlation score may comprise, for example, the number of matching identifiers (a raw score) or a ratio of the number of matching identifiers to the total number of identifiers (a matching percentage) or a ratio of the number of matching identifiers to the number of non-matching identifiers (a raw score ratio).

In an embodiment where the identifiers comprise individual letters (a name for example) or numbers (a personal identification number, for example), the number of matching identifiers can be easily determined. That is, a letter at a given location and/or sequence on the first media either matches or does not match the letter appearing at the same location and/or sequence on the second media. When the number of matching and non-matching identifiers is determined, the appropriate metric can be calculated and compared to a predetermined threshold to authenticate or validate the user or the application.

In an embodiment where the identifier comprises gestures, biometrics, or physical appearance or physical attributes, for example, the system or device performing the validation or authentication must determine, beforehand, the extent to which the first gesture (biometric or physical appearance or attribute) must match the second gesture to authenticate or validate, i.e., determine a threshold. For example, a gesture can be divided into a plurality of sub-gestures and each first-entered sub-gesture compared with each second-entered sub-gesture. The user or holder is then authenticated or validated based on a metric derived from the number of matching sub-gestures.

In some embodiments, the user's identity can be verified without communicating with an external database or passing personal information over network connections. Cards in particular, such as but not limited to payment, insurance, loyalty and identification cards, may be validated locally without utilizing public network connections or server-side solutions, such as cloud connectivity or a remote database lookup, thereby increasing security by enabling data to be entered and validated locally.

In the case of a low correlation score, a notification may be sent to one or more entities and/or the user, alerting authorities of a possible security breach or identity theft. In some embodiments, a low correlation score may generate questions based on identifiers locally accumulated from previous media. Those questions are then addressed to the user. If a fraudulent action is detected, devices, applications and/or accounts can be tagged, impaired or disabled.

BRIEF DESCRIPTION OF THE FIGURES

The forgoing and other features of the present invention will be apparent to one skilled in the art to which the present invention relates upon consideration of the description of the invention with reference to the accompanying drawings, herein.

DETAILED DESCRIPTION

Before describing in detail the particular methods, systems and apparatuses related to data-acquiring systems and components that provide additional levels of access and security, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments. The presented embodiments are not intended to define limits as to the structures, elements or methods of the inventions, but only to provide exemplary constructions. The embodiments are permissive rather than mandatory and illustrative rather than exhaustive.

This invention discloses a method and system to verify identity while protecting the private information of the user or holder that is used to verify that identity. In one aspect of the invention, identity of a user may be verified locally without communicating the private information to an external or remote database (such as a cloud-based database) and without passing the private information over network connections, which may compromise the privacy of that private information.

Figure 1:
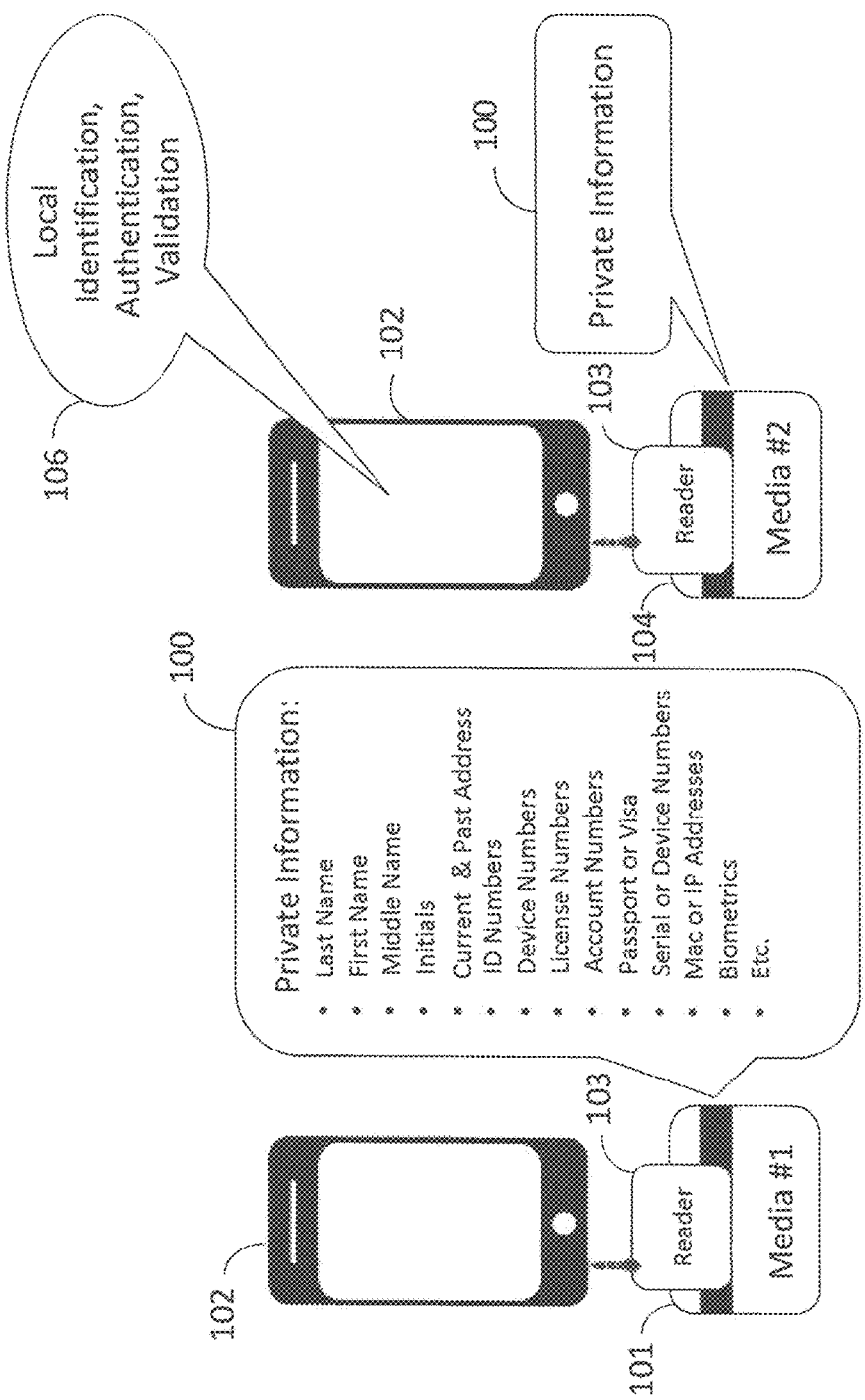
FIG. 1 illustrates devices for locally identifying, authenticating or validating a user's private information.

Under one embodiment, private information 100 (see FIG. 1) from a first information-holding media 101 is input, captured and/or scanned into a device 102, as shown in FIG. 1. The private information relates to or is "owned" by a first user. Information may be read, scanned, imaged, input or entered into the device 102 via a number of techniques, but is typically read from the media 101 using a media reading device or a "reader" 103. Private information 100 may be subsequently input, captured and/or scanned from a second information-holding media 104; that information may be similar or dissimilar to the information on the first media.

With private information from both the first media 101 and a second media 104 input to a device 102, the device 102 then compares the information received from these information-holding mediums to identify and/or authenticate and/or validate (as shown in a bubble 106) the user by determining that there is a high degree of correlation (e.g., in excess of a predetermined correlation threshold and/or percentage or mathematical value) between the private information resident on the media 101 and the private information resident on the media 104. A high degree of correlation indicates that the private information on both media relate to the same user/owner/holder. The user/owner/holder is thereby authenticated, e.g., the user/owner/holder is permitted access to a secure facility, permitted access to a financial account, permitted access to a software application, etc, as non-limiting examples.

Alternatively according to another embodiment, after the user/owner/holder has input the private information from a media 101 and after a period of time has elapsed from inputting of that private information, private information from the same media 101 may be entered into the device 102. This method validates that the media 101 is indeed in the possession of the user/owner/holder. Again, a high correlation score authenticates the user/owner/holder.

In some non-limiting embodiments, data input into a device (or an application resident on a device) from a media becomes the "identity" of that device or application. For example, private information loaded onto a smart wallet may constitute the identity of that smart wallet.

Information from one or more other information-holding mediums may also be compared for correlation. Generally, the private information is stored in media 101 and 104 and in one embodiment the media 101 and 104 comprise a magnetic stripe card. However, other media capable of storing information, such as the private information utilized by the present invention, may comprise the media 101 and 104.

The private information referred to herein generally comprises information that can be segregated into a plurality of individual identifiers. In a simple non-limiting example, the private information may comprise a string of one or two digit numbers with each number considered an identifier of or for the private information. For example, a string stored in the media 101 may comprise six numerical identifiers: 3 44 67 9 10 and 32; the string stored in the media 104 may comprise the identifiers 3 44 6 9 11 and 32. After input to the device 102 the two strings are compared and the comparison process determines the number of matches and from that a correlation score is determined. In the given example, four of the six numbers match in the two strings. This is merely a simple example as generally, the identifiers can be more complex elements such as a name, biometrics, etc.

In some non-limiting embodiments, calculating a correlation score and comparing the score to a predetermined, cumulative and/or average score or score threshold may be used to identify, validate, or authenticate the user/holder.

If the resultant correlation score is sufficiently high, (e.g., exceeding a predetermined threshold), data from the second information-holding media (such as the media 104 of FIG. 1) and/or other information-holding mediums are determined to belong to the same entity, user, or individual as data from the first information holding medium (such as the media 101 of FIG. 1). This appropriately high correlation score verifies or authenticates the identity and/or approves an action.

If the correlation score is below the predetermined threshold, the authentication or identity is not verified and a notification may be sent to one or more entities associated with the transaction, alerting authorities of a potential security breach. If a fraudulent action is detected, devices, applications and/or accounts may also be tagged, impaired and/or disabled as in some non-limiting embodiments.

The private information 100 as referred to herein and illustrated in FIG. 1 comprises any information or data that can identify an individual, an account, a device or an entity. Non-limiting examples of private information include but are not limited to last name, first name, middle name, initials, current or previous addresses, phone numbers, account numbers, license numbers, identity numbers such as passport or visa numbers, device numbers such as serial numbers, MAC addresses, IP addresses, biometrics and other forms of personal information collectively referenced herein as "private information" 100.

Figure 2:
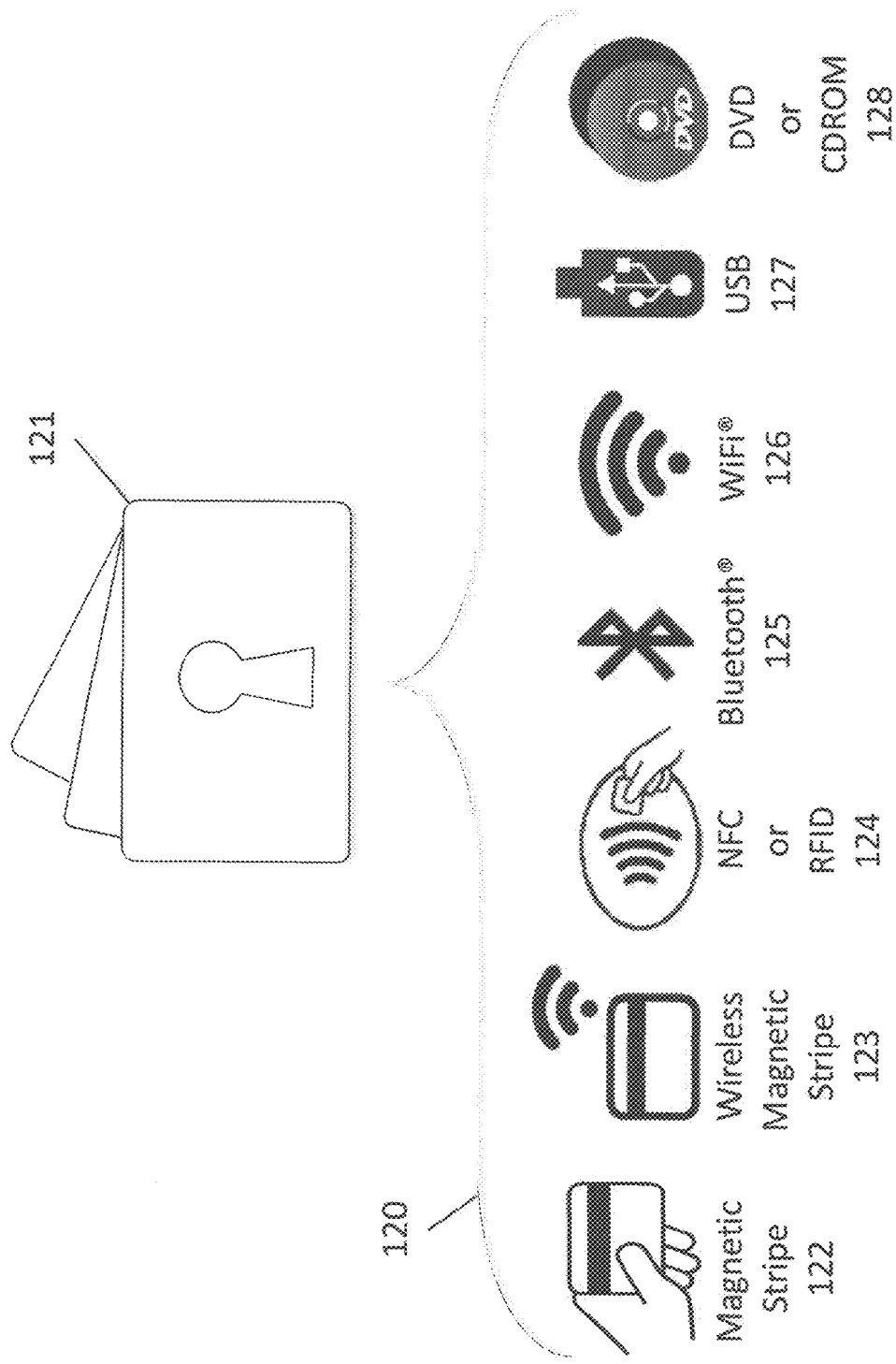
FIG. 2 illustrates non-limiting examples of communications techniques for use with the present invention.

The private information of interest herein is typically stored in a memory device and/or another type of information-holding medium. FIG. 2 illustrates non-limiting examples of different types of information-holding media 120 that can be input into one or more devices, such as the device 102 of FIG. 1, a smart wallet 121 of FIG. 2, or a smart phone. A smart phone is generally regarded as a communications device having telephone-like functionality as well as additional computer-like functionality.

These information-holding media 120 may comprise, for example but are not limited to, a magnetic stripe 122, a wireless magnetic stripe 123, an NFC (near field communication) or an RFID (radio frequency identification) element 124, a Bluetooth® element 125, a WiFi® element 126 (and/or other radio frequency devices), a USB (universal serial bus) element 127 (or another serial memory devices), and/or a CD/ROM (compact disc, read only memory) or DVD (digital video disc) 128 or any other media and/or electronic devices that can store the private information, collectively referenced herein as "media 120".

The type or format of the media or the private information stored therein is not pertinent to the present invention. The invention applies to any media that stores information that can be transferred to another device where the private information can be in any format so long as the private information can be interpreted (and converted to another format if required) and compared within the device 102.

Information may be read, scanned, imaged, input or entered via a number of methods, but is typically read from a media using a media reading device such as the reader 103 as shown in FIG. 1. For instance, magnetic stripe cards are typically read using a magnetic stripe reader. Other media such as RFID components also utilize devices that are generally referred to as "readers", but are actually electromagnetic wave receivers or transceivers that communicate with the RFID component using radio frequency communications.

Figure 3:
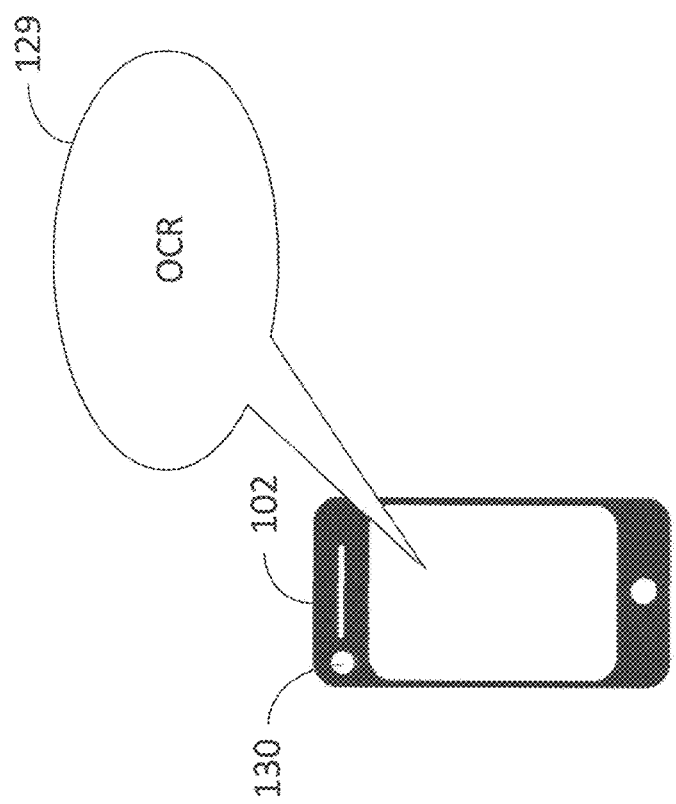
FIG. 3 illustrates an optical character recognition embodiment of the present invention.

OCR (optical character recognition) techniques may also be used to input private information appearing on a media or a card, for example, according to one aspect of the present invention. As illustrated in FIG. 3, a user may convert private information via an OCR process, as represented by a bubble 129 that embodies an image capture process performed by an imaging sensor 130 (and attendant hardware and software components) on the device 102. The captured private information may be used for identification, authentication, and/or validation of the user/holder. The imaging sensor 130 may comprise but is not limited to a camera, optical sensor or a similar optical device with image-capture functionality.

Figure 4:
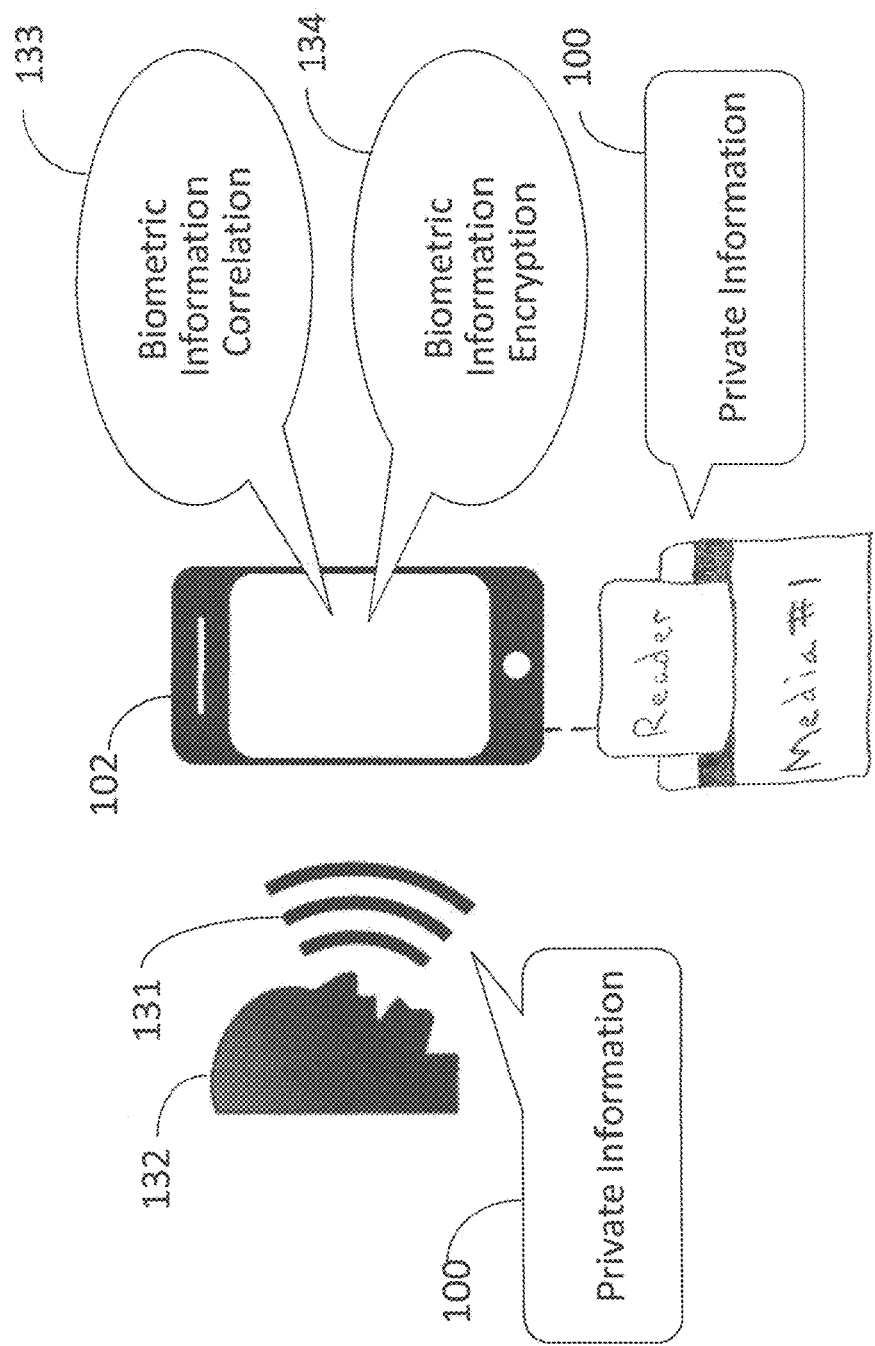
FIG. 4 illustrates the use of biometric information in one embodiment of the present invention.

Yet another non-limiting method to enter private information into the device 102 may comprise voice or sound. See FIG. 4. In one such an embodiment the private information 100 is represented by vocal utterances 131 for use in recognizing a single speaker 132. Thus once authenticated, only the single speaker 132 will be able to enter private information 100 into the device 102. The private information 100 is correlated with one or more biometrics (as represented by a bubble 133) resident in or previously loaded into the device 102.

The private information may be encrypted (as represented by a bubble 134 in FIG. 4) using one or more encryption keys including but not limited to biometrics as either a key or one element for use in generating a key to encrypt the private information 100. The private information 100 may be encrypted prior to input into the device 102 and/or while the private information is stored in the device 102.

Other methods that may be used to input private information include but are not limited to wireless communications, physical communications, networks, keyboard entry, and the like.

In several aspects of the present invention, private information from one or more media may be verified locally by one or more devices, such as the device 102 of FIG. 1. Devices may include but are not limited to personal computers, laptops, tablets, dongles, servers, mobile devices, wearable devices, or any other devices that have a non-transitory memory, all collectively referenced herein as "devices."

In other embodiments, devices may be connected to a network, such as in the non-limiting case of a cell phone. Devices connected to a network are herein referred to as "connected devices." However, in some non-limiting embodiments, the device is preferably disconnected from any network when performing authentication/verification using the private information according to the present invention. Such devices are referred to as "disconnected devices." In other non-limiting embodiments, the device may be disconnected while establishing connection with other devices at times that are specific to perform some action. Such devices are called "intelligently connected devices" herein.

In some embodiments, certain devices may often be used for identification, verification and/or authentication, called herein "authentication devices." In some non-limiting embodiments, when a connected or intelligently connected device receives and recognizes private information, then that device will send that information to an "authentication device."

In some embodiments, an action may involve interaction with remote devices over WiFi®, RF, Bluetooth®, or another network connection, as non-limiting examples. In some embodiments, authentication via an "authentication device" may precede and/or augment the local identity validation process.

Figure 5:
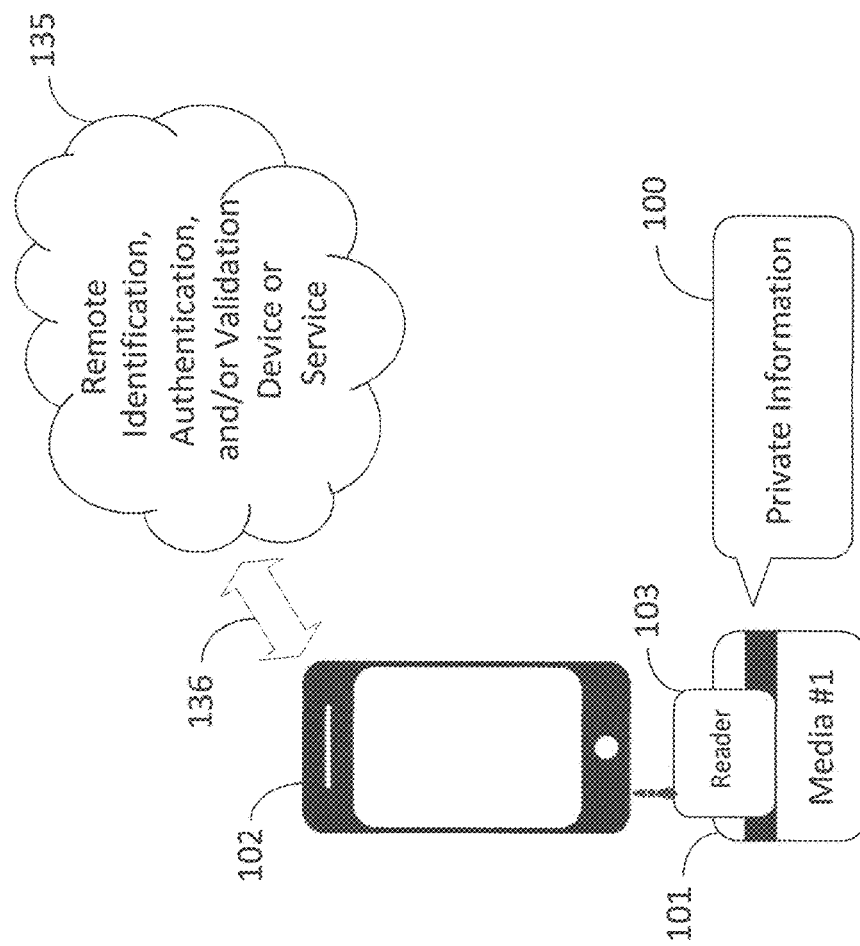
FIG. 5 illustrates the use of a remote device or service in one embodiment of the present invention.

In some embodiments, a third party authentication service, herein referred to as an "authentication service," may be used to authenticate a user in one non-limiting method. As shown in FIG. 5, after the private information 100 from the media 101 is input or scanned into the device 102 via the reader 103, the device 102, in one embodiment, communicates over a link 136 with a cloud-based authentication device or service 135 including but not limited to one or more servers or clouds.

In some non-limiting embodiments the authentication service 135 may request additional information or answers to one or more security questions during the authentication process. Questions may be fixed or predetermined based on the correlation score or percentage, or derived dynamically from identifiers collected from media. In some embodiments, questions may be derived locally to the device from information local to the device.

In order to protect the private information, the private information can be translated to a code or a token that communicates with the remote identification, validation and/or authentication device and/or service 135, as in some non-limiting embodiments. In one embodiment, this token may be dynamic, a one-time-use code and/or token or cryptogram that changes upon every authentication and/or action to increase security. This token may convey or represent personal, account, and/or private information to a remote device such that authentication may take place without actually passing any personal information that can be easily discerned.

In some embodiments, devices contain software that performs various actions using data collected from media. This software includes but is not limited to applications, executable programs, scripts and/or databases collectively referred to herein as "applications."

Non-limiting examples of actions that applications and/or devices may execute may include identification, authentication, verification, validation, and/or data transfer from one device or media to another. These and other functions performed by a device and/or application are called "actions" herein.

An application may also be used to receive, recognize, and/or send private information. In some embodiments, the application may be present on a local verification device. Herein, information may be directly received, recognized and/or correlated without a connection to any outside device. However, in other non-limiting embodiments, the application may reside on another device. Authentication between applications and or devices may be required before information is shared.

In some embodiments, these applications and devices may be used for a number of different actions including but not limited to transactions such as financial transactions. One or more devices may govern these actions including but not limited to digital, electronic, intelligent or smart wallets, referenced herein as "smart wallets." Devices may include mobile devices such as but not limited to phones, wallets, tablets and/or laptops; wearable devices such as but not limited to watches, bracelets, necklaces, and/or rings; and/or transitory and non-transitory memory devices such as computers, servers and the like.

Under this invention, data is correlated with previously recorded and/or entered data to ensure the new data belongs to the same individual, user, account, and/or device. In some non-limiting embodiments, the first data that is input into a device or application from the first media becomes the "identity" of the device or the application within that device. In one embodiment, this data may be stored within a tamper-proof secure component on or of the device, or accessible by the device or any software resident on the device. In other embodiments, this information may be stored within a statistical model, which may also be stored within a tamper-proof secure component on or of the device, or accessible by the device. Data from all subsequent devices or media may then be compared with the first data input to verify identity and/or determine permitted actions. In some non-limiting applications, the identity of a device or application can only be changed after the first data is input upon a full reset of the device and/or application.

Locally stored data or locally stored values may be used to generate dynamic knowledge-based questions to test authentication further, allowing a non-standard challenge-response security system to run completely offline, without the need for a network backend from which questions are usually generated and vulnerable to intercept or attack. In some embodiments, questions may be used to further validate the individual or entity and help prevent spoofing or possible social engineering hacks by keeping all data entirely under the control of the user (i.e., the owner of the private information).

In some non-limiting examples, cards, or information of such, including but not limited to payment, loyalty, insurance and identification cards may be validated locally without traversing the Internet or accessing a cloud. Thus, security is increased by enabling data to be entered and validated locally on one or more devices, applications, or databases.

In one non-limiting example, if personal information on one media such as a credit card correlates closely enough to personal information on another media, an action is approved. However, upon denial, a notification may be sent to one or more entities alerting authorities of a security breach or identity theft. If a fraudulent action is detected, devices, applications and/or accounts may be tagged, impaired or disabled. In some embodiments, the device may be shutdown and disabled.

In one embodiment, a specific piece of information related to a specific user may be used to authenticate a user, account, and/or device when recording data from one or more media into a mobile or wearable device. Such information will herein be referred to as "identifiers." Identifiers may include but are not limited to one or more last names or account numbers. In some embodiments, an identifier may be one or more biometric inputs from one or more users, and may be tied to one or more other identifiers such as account numbers or last names. Under one embodiment, one or more identifiers were previously assigned to a device during initial training. When media containing one or more identifiers correlates to one or more of the trained identifiers with sufficient correlation score, then the data within that media is accepted and the action is approved. If none of the identifiers match one or more of the identifiers specified during training, then the input of the media is denied.

In some embodiments, only media that contain one or more last names are accepted. In another embodiment, one or more first and middle initials and/or names are also accepted or used to authenticate, along with the last name and/or other common personal information. Yet other embodiments consist of a method wherein one or more prefixes and/or suffixes may be used either individually or in correlation with one or more other names or parts of names to authenticate a user.

In yet another embodiment, performance of the algorithm improves as more private information is approved/correlated. Under yet another embodiment, the algorithm training can be improved as more private information is input. As a non-limiting example, a user may enter or scan in a first media with the name John Jones. He may then scan in a second media containing the name John Jones Jr. This suffix may then be recorded by the algorithm thereby inhibiting the ability to authenticate a user who enters any media with a different suffix or without a suffix.

Security may be further improved using the verification invention described herein by permitting media to be input or scanned only into a verifying device directly, avoiding servers, applications, cloud solutions or even wireless applications that require data to be transmitted over some medium. Data transfer directly to the verifying device from a given media reduces any chance of data intercept during data transfer.

Likewise, security may be further improved using tokenization and/or encryption methods to secure the data prior to transfer to any device.

To further improve the security of identify information and the validation process on commercially available devices, it may be advantageous to isolate private data from the device operating system.

In one method, one or more readers and/or receiver/transceivers containing one or more sensors may have encryption capabilities, encrypting each image and/or private information immediately after or as it is read and/or received. In yet another non-limiting method of the present invention, one or more entities including but not limited to the application may install a driver to the operating system that enables direct interoperation with readers and/or image without the operating system typical interface with the sensor, thereby bypassing the operating system to enable direct data-to-application input.

In instances wherein a user enters or scans the same information a second time for verification and authentication, the information may be transformed into a token before it is sent to the verification device. A malware scan could also be performed prior to any data input received or captured.

In another non-limiting method, connections between the device and any other entities, may be turned off by non-limiting means including by the application. It may also be optimal, for purposes of security, to only allow one verification device to remain connected during the identity validation process.

In some embodiments, a predetermined or dynamically calculated time limit may be set in place after the acceptance of one or more cards, media or information of such. Time limits may regulate when (and when not) additional private information may be entered for the purpose of executing the authentication process described herein.

In some non-limiting embodiments, the user device, application, or software may require the inputting of one or more medium that is different from the first media. However, in other non-limiting embodiments, one or more entered information may be the same. As a non-limiting example, a user may input some private information into a device during registration. The user may then have to wait a specified amount of time before the same and/or additional private information is entered, for the purpose of determining if the later entered information correlates with the earlier entered information. This approach guards against theft by individuals, such as but not limited to waiters and waitresses, by requiring them to hold the media and/or the private information for a period of time.

Once card information (i.e., private information) has been received and recognized, a series of non-limiting steps may be applied to define each information with regard to each information's respective category. The order of the given steps as referenced hereafter is not meant to be fixed or definite and is non-limiting. However, it is meant for purposes of clarification and as a non-limiting example for the method herein described. Each step or identification technique is not definite and may be altered or changed as required by the different applications of the present invention.

As a non-limiting example, information held on cards containing magnetic stripes may be input or "scanned" into a device such as but not limited to a smart wallet by swiping the card through a magnetic card reader. The information may then be validated by a process local to the reader, the device, or in other embodiments, encrypted and intelligently connected to a validation service that performs the validation before sending the information to memory within the device. Under each embodiment, the information is kept secure during the validation process and validated without putting privacy at risk.

Under this magnetic stripe example, the number of tracks may be identified during the card identification process. In one non-limiting embodiment, the start and end sentinels of each track are identified in order to determine the number of tracks. Those versed in the art will recognize that each track may contain one or more sentinels; however, such embodiments are non-limiting and are subject to change as media standards may change. Track one may include non-limiting sentinels such as a "%" for start and a "?" for the end. Track two sentinels may include but are not limited to a ";" for the start sentinel and a "?" for the end sentinel. Track three sentinels may include but are not limited to a ";" or a "%" for the start and a "?" for the end. Once each sentinel is identified, then the number of tracks may be identified.

After identifying the number of tracks and the point where each track ends, data between the sentinels is then searched for and identified. Such data may include but is not limited to an expiration date, a primary account number, a service code, a name, and/or a format code. In some non-limiting embodiments, if a format code contains the letter "B," then the card may be identified as a payment card. However, in another non-limiting embodiment, if there is a "B" in track one and there is only one track, then a re-input of the card may be required.

After identifying the "B" in the card, the primary account number (PAN) parsed. Those skilled in the art will readily recognize that the PAN is usually located between the "B" and the first field separator. The PAN may consist of up to nineteen digits, or as few as fifteen digits. Once the PAN has been parsed, any numbers that are not between 0 and 9 (invalid characters) may then be identified.

In another non-limiting embodiment, the number may be further verified by checking the first six digits of the PAN (Payment Account Number). These digits may then be matched to a series of digits that determine if it is a bank identifier number (BIN) referred to hereafter as a "BIN list." The BIN list consists of a series of six or more numbers derived from a range of all known financial cards including those used to identify a given gift card. If the first six digits are matched with any six numbers of the correct specified order in the BIN list, then the card is determined to be a gift card.

Yet other non-limiting methods to identify a whether a given magnetic stripe card is a gift card consists of parsing the discretionary data of track one. Herein, a card is identified as a gift card if track one contains all zeros. A gift card may also be identified if the name on the card contains the words "PAID" or "GIFT", or some other descriptive that would indicate a gift card. Alternatively, information may be determined to not be a gift card, in some non-limiting embodiments, if the name contains any digits of zero through nine or if the name contains a "$" symbol (dollar sign).

If the card is determined not to be a gift card, then the name on the card is matched with the user name (the name of the first card swiped). In cases where the card has been scanned into the device for the first time, the name may be matched with the user name of the device. In both cases, if the name matches, then the card may be accepted. However, if the name does not match, then a re-swipe may be required or the information may be rejected.

In some non-limiting embodiments, if track one is not present, then track two may have to be checked for a field separator. If track two is determined to not have a field separator, then the card may be identified as a loyalty card or some other type of card. However, if a field separator is present, then the card may still be a payment card, and track one may be re-analyzed.

In some embodiments, track three of a magnetic stripe may also be checked for valid information. If track three is present, further analysis is performed on the information to classify the card as a gift, insurance, or identity card and the like.

This method of local identifier (i.e., private information) validation has numerous advantages, including authentication while preserving privacy. This method may achieve the world's first disconnected identity validation system. Under the various methods previously described herein, individuals, accounts, devices and even financial records may be authenticated locally without passing private information over a cloud connection and running a background check, as non-limiting examples. Comparing private information locally without use of the Internet or any other communication system preserves privacy and prevents any opportunity for an attack or the interception of private information. Thus, improved security is achieved without compromising privacy or security.

According to one embodiment, each of the media bearing private information may comprise a different number of identifiers. In one non-limiting example, the private information on the media 101 (see FIG. 1) may comprise five identifiers and the private information on the media 104 may comprise eleven identifiers. The correlation score is based on how many of the five identifiers on the media 101 match five of the eleven identifiers on the media 104. The user/owner is authenticated to a first level if the correlation score based on the number of those matches is above a predetermined threshold.

Once the user/owner has been authenticated to the first level as in the paragraph immediately above, the six additional identifiers on the media 104 that were not used for the first level authentication may be used for a second (higher level) authentication, in some embodiments. For example, a third media may comprise fifteen identifiers. To authenticate the user to the second level, a higher correlation score may be required and that score may be based on matching a greater number of identifiers than the five identifiers required for authentication to the first level. For example, for the second level authentication it may be required that ten of the eleven identifiers on the media 104 match ten of the fifteen identifiers on the third media.

Figure 6:
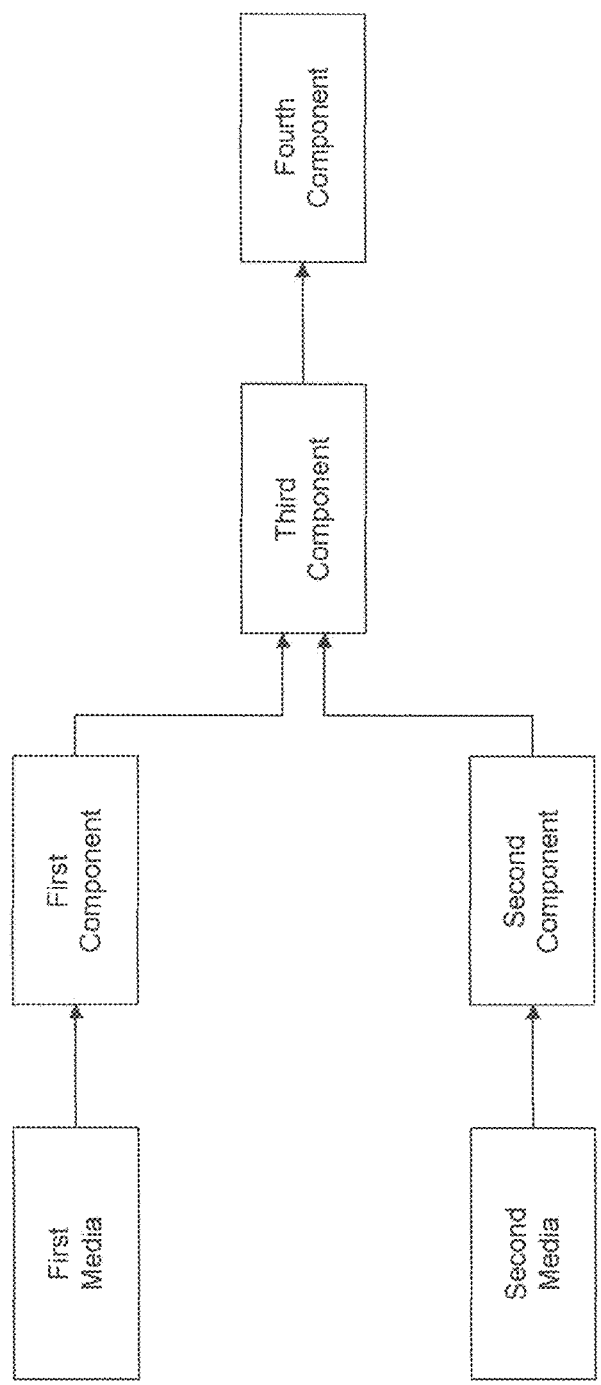
FIG. 6 illustrates a system for implementing the teachings of the present invention.

FIG. 6 illustrates first and second media storing respective first and second private information of a user/owner/holder. The first and second private information is transferred from the respective first and second media by respective first and second components (e.g., as the first and second components read the first and second media) of a device. A third component of the device compares identifiers associated with the first and second private information. A fourth component determines whether to authenticate or validate the user/owner/holder based on the comparison carried out by the third component.

Embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described herein with reference to example applications for illustration only. It should be understood that numerous specific details, relationships, and methods are set forth to provide a full understanding of the embodiments disclosed herein. One having ordinary skill in the relevant art will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with the embodiments. All examples and exemplary alternatives set forth in the application are merely for illustration and are intended as non-limiting examples and alternatives.

As used herein, the term "reader" is intended to encompass all devices and techniques for determining and/or converting the content of all information, in digital or analog form, for analysis by a device and/or by a software application.

As used herein, the term "transaction card" refers to any card carrying information thereon that is used to execute a transaction, such as, but not limited to, encoded codes, credit cards, gift cards, debit cards, reward cards, insurance cards, access cards, stored value cards, transportation cards, identity cards, and the like.

What is claimed is:

1. A method for verifying a user, the method comprising:
   the user transferring a first user identifier from a first source to a device;
   the user transferring a second user identifier from a second source to the device, the first source different from the second source and the first user identifier different from the second user identifier;
   the first source comprising a first media and the second source comprising a second media;
   the first and second user identifiers not stored in the device prior to the steps of transferring;
   comparing the first and second user identifiers or corresponding portions of the first and second user identifiers at the device without sending the first and second user identifiers nor the corresponding portions of the first and second user identifiers external to the device;
   at the device determining a correlation score responsive to the comparing step;
   at the device determining a relationship between the correlation score and a predetermined correlation threshold;
   at the device, verifying that the first and second user identifiers identify a same person if the correlation score is greater than or equal to the predetermined correlation threshold, and if a step of transferring the second user identifier was executed within a predetermined time interval from the step of transferring the first user identifier; and issuing an indication according to a verifying step.

2. The method of claim 1 wherein the device comprises a non-network connected device such that the steps of transferring, comparing, determining, and verifying are executed without connections to a network, without using an over-the-air communications interface, and without using a database external to the device.

3. The method of claim 1 further comprising authenticating the same user to conduct a transaction using the device, or permitting the same user to access an application on the device, or permitting the same user to access a storage cloud.

4. The method of claim 1 wherein the first source comprises the first media or a first transaction card and the second source comprises the second media or a second transaction card.

5. The method of claim 4 wherein the first transaction card comprises a first magnetic-stripe card and the second transaction card comprises a second magnetic-stripe card.

6. The method of claim 1 wherein biometrics of the user as input to the device is also used in determining the correlation score.

7. The method of claim 1 wherein the first or second user identifier comprises a security identifier or comprises private information, and the private information further comprises any one or more of a user's last name, a user's first name, a user's middle name, a user's initials, a user's current or previous addresses, a user's phone number, a user's account number, a user's license number, a user's identity number, a user's biometrics and a device number, a device serial number, a device MAC address, and a device IP address.

8. The method of claim 1 wherein the first and second sources each comprises any one of a memory device, a data storage device, a magnetic stripe card, a memory operative with a radio-frequency identification component, a memory operative with a near-field communications component, a memory operative with a WiFi™ component, a memory operative with a universal serial bus component, a serial memory component, a compact disc/read only memory, or a digital video disc.

9. The method of claim 1 wherein the device comprises any one of a personal computer, a laptop computer, a tablet computer, a dongle, a server, a mobile device, a smart phone, a wearable device or any device comprising a non-transitory memory element.

10. The method of claim 1 wherein the second user identifier comprises more elements than the first user identifier, and wherein if the user is verified then the second user identifier is used in subsequent verification attempts of the user.

11. The method of claim 1 wherein the step of transferring the first user identifier from the first media comprises using an optical character recognition component operative with the device, and the step of transferring the second private identifier from the second media comprises using an optical character recognition component operative with device.

12. The method of claim 1 wherein prior to the step of transferring the first and second user identifiers the method further comprises one or more of a step of encrypting the first and second user identifiers, a step of disconnecting the device from a network, and a step of scanning the first and second user identifiers for malware.

13. The method of claim 1 wherein the step of verifying further comprises verifying the user by the device interacting with a remote authentication service.

14. The method of claim 1 further comprising generating a first token that represents the first user identifier and generating a second token that represents the second user identifier, wherein the steps of transferring the first user identifier and transferring the second user identifier comprise respectively transferring the first and second tokens to the device.

15. The method of claim 1 wherein the first and second user identifiers each comprise private information of the user, the method further comprising a step of asking knowledge-based questions derived from the private information, wherein the step of verifying is executed if the correlation score is greater than or equal to the predetermined correlation threshold, if a step of transferring the second user identifier was executed within a predetermined time interval from the step of transferring the first user identifier, and the user has correctly answered the knowledge-based questions.

16. The method of claim 1 wherein the correlation score comprises an initial correlation score, the method further comprising:

authenticating the same person to a first authentication level responsive to the initial correlation score;

receiving a third user identifier from a third source;

determining that the third user identifier identifies the same person without sending the third user identifier external to the device; and responsive to the step of determining, authenticating the same person to a second authentication level higher than the first authentication level.

17. A system for verifying a user, the system comprising:

a first component for transferring a first user identifier from a first source;

a second component for transferring a second user identifier from a second source, the first source different from the second source and the first user identifier different from the second user identifier;

the first source comprising a first media and the second source comprising a second media;

a predetermined time limit between the first component transferring and the second component transferring;

the first and second user identifiers not stored in the system prior to the first and second components transferring the respective first and second user identifiers;

a third component for comparing first user identifier portions extracted from the first user identifier and second user identifier portions extracted from the second user identifier and for determining a correlation score responsive thereto, such that comparing and determining are not executed external to the system; and a fourth component for verifying that the first and second user identifiers identify a same person if the correlation score is greater than or equal to a predetermined correlation threshold and if a time interval between the first component transferring and the second component transferring is less than the predetermined time limit.

* * * * *